United States Patent
Tanaka et al.

[11] Patent Number: 5,501,887
[45] Date of Patent: Mar. 26, 1996

[54] RESIN LAMINATE

[75] Inventors: Hiroshi Tanaka; Kozo Morishige, both of Ichihara; Katsushi Watanabe, Matsushige; Shigetoshi Kashiyama, Naruto, all of Japan

[73] Assignees: Mitsui Petrochemical Industries, Ltd., Tokyo; Otsuka Pharmaceutical Factory, Inc., Tokushima, both of Japan

[21] Appl. No.: 174,332

[22] Filed: Dec. 28, 1993

[30] Foreign Application Priority Data

Dec. 28, 1992 [JP] Japan ................................ 4-348928
Nov. 15, 1993 [JP] Japan ................................ 5-284904

[51] Int. Cl.$^6$ ........................................... B29D 22/00
[52] U.S. Cl. .................. 428/35.2; 428/36.9; 428/36.91; 428/212; 428/220; 383/38; 206/219
[58] Field of Search .................... 428/35.2, 36.9, 428/36.91, 212, 220; 383/38

[56] References Cited

U.S. PATENT DOCUMENTS 4,775,502 10/1988 Shishido et al. .......................... 428/35
4,961,495 10/1990 Yoshida et al. .......................... 206/806

OTHER PUBLICATIONS

Abstract of JP-A-4-266759 Sep. 22 1992 (WPI Acc No: 92-363045/44).
Abstract of JP-A-63-248633 Oct. 14, 1988 (WPI Acc. No. 88-334808/47.
Abstract of JP-A-3-277365 Dec. 9 1991.
Abstract of JP-A-2-4671 (XRAM Acc No: C89-162046).
Abstract of JP-U-5-5138).
Abstract of JP-A-62-64363 (XRAM Acc No: C87-036546).

*Primary Examiner*—Edith Buffalow
*Attorney, Agent, or Firm*—Nixon & Vanderhye

[57] ABSTRACT

Disclosed is a resin laminate comprising: an outer layer formed from a linear polyethylene having a specific density; an inner layer formed from a linear polyethylene having a specific density; and an intermediate layer(s) provided between the outer layer and the inner layer, wherein at least one intermediate layer comprises a linear polyethylene having a specific density different from those of the linear polyethylenes for forming the outer layer and the inner layer; and at least one layer of the outer, inner and intermediate layers is formed from a linear polyethylene composition containing a high-density polyethylene having a specific density. Also disclosed in a container formed from the resin laminate. The resin laminate is excellent in hygienic qualities, transparency, flexibility and heat resistance. The container is hardly distorted even when subjected to a sterilization process under severe conditions, and is excellent in heat resistance, sealing strength, drop strength, transparency and flexibility.

9 Claims, 1 Drawing Sheet

RESIN LAMINATE

FIELD OF THE INVENTION

The present invention relates to a resin laminate in the form of a film, a sheet or a tube and use thereof. More particularly, the invention relates to a resin laminate composed of three or more layers each of which is made of a polyethylene resin composition, and to a container formed from the resin laminate for containing medicine or food, for example, a retort pouch or an infusion bag, after subjected to a sterilization under high temperature conditions.

BACKGROUND OF THE INVENTION

Medical plastic containers, particularly infusion bags, are desired not only to be excellent in flexibility and transparency but also to have heat resistance and strength high enough to stand a sterilization under high temperature conditions. Retort pouches used for retort foods are also subjected to the sterilization at high temperatures, so that the retort pouches also preferably have heat resistance and strength of certain level, though the level is not so high as that for the medical containers.

As the medical plastic containers, the following polyethylene type multi-layer containers have been heretofore proposed.

For example, Japanese Patent Laid-Open Publication No. 4363/1987 proposes an medical bag formed from a three-layer laminate consisting of an inner layer, an outer layer, each of which is made of an ethylene/α-olefin copolymer having a density of not less than 0.920 g/cm$^3$, and an intermediate layer made of an ethylene/α-olefin copolymer having a density of less than 0.920 g/cm$^3$.

Japanese Patent Laid-Open Publication No. 248633/1988 proposes a plastic container of a three-layer structure consisting of an inner layer, an outer layer, each of which is made of a linear low-density ethylene/α-olefin copolymer having a density of 0.910 to 0.940 g/cm$^3$, and an intermediate layer made of a linear low-density ethylene/α-olefin copolymer having a density of 0.880 to 0.905 g/cm$^3$, wherein a difference of the density between the inner layer and the intermediate layer and between the outer layer and the intermediate layer is at least 0.01 g/cm$^3$.

Japanese Patent Laid-Open Publication No. 277365/1991 proposes a bag for medical liquid formed from a three-layer laminate consisting of an inner layer made of a branched low-density polyethylene having a density of not less than 0.918 g/cm$^3$, an intermediate layer made of a linear low-density ethylene/α-olefin copolymer having a density of not more than 0.915 g/cm$^3$, and an outer layer made of a linear low-density polyethylene having a density of not less than 0.920 g/cm$^3$.

However, the medical bag, the plastic container and the bag for medical liquid described above have various drawbacks. Particularly, their insufficient heat resistance is a serious problem. In other words, these molded articles are deteriorated in sealing strength and drop-impact resistance if the molded articles are subjected to a sterilization under high temperatures, for example, a high-pressure steam sterilization or a hot water sterilization. Especially when the sterilization is carried out under the severe conditions such as a temperature of not lower than 120° C., those molded articles are markedly lowered in the sealing strength and drop-impact resistance, and moreover, they are distorted and deteriorated in transparency and flexibility.

Japanese Patent Laid-Open Publication No. 266759/1992 proposes a medical bag improved in the heat resistance. This medical bag is formed from a laminate film, a laminate sheet or a laminate tube, having at least three layers. In this medical bag, each of the inner and outer layers is made of a composition comprising a low-density polyethylene having a density of not more than 0.930 g/cm$^3$ prepared by a radical polymerization and a high-density polyethylene having a density of not less than 0.945 g/cm$^3$ and Mw/Mn of not more than 4.0 in an amount of 5% to 40% by weight, and the intermediate layer is made of a composition comprising a linear low-density polyethylene having a density of not more than 0.920 g/cm$^3$ and having a short branched chain and the above-mentioned high-density polyethylene in an amount of at most 15% by weight.

However, the medical bag is insufficient in the transparency and the sealing strength if the bag is subjected to the sterilization at a high temperature.

By the way, studies on the medical plastic containers having plural chambers have been made for the purpose of separately holding two or more kinds of liquid medicines, such as an amino acid solution and a sugar-electrolyte solution or an antibiotic and a solvent, and sterilely mixing them when they are used. For example, Japanese Patent Laid-Open Publication No. 4671/1990 proposes a bag-shaped container made of a polyolefin resin. This container is provided with plural chambers separated from each other by means of a seal having easy peel open properties.

In this bag-shaped container, however, heat resistance properties are not taken into account so much. Therefore, the container cannot bear the above-mentioned severe sterilization conditions of a temperature of 120° C. As a result, there arise such problems that the container is distorted and that the sealed portion for separating the plural chambers is weakened.

Accordingly, the advent of a resin laminate excellent in hygienic qualities, transparency, flexibility and heat resistance, and the advent of a container formed from the resin laminate, particularly a medical container, have been eagerly desired.

OBJECT OF THE INVENTION

The present invention is intended to solve such problems associated with the prior art technique as described above, and it is an object of the invention to provide a resin laminate employable as a material of a container which has such a high heat resistance as is hardly distorted even when subjected to a sterilization under the severe conditions such as a temperature of 120° C. and which is excellent in transparency, flexibility, mechanical strength and hygienic qualities, and to provide a container formed from the resin laminate.

SUMMARY OF THE INVENTION

The resin laminate according to the present invention comprises:

an outer layer comprising a linear polyethylene having a density of not less than 0.910 g/cm$^3$ and less than 0.950 g/cm$^3$, an inner layer comprising a linear polyethylene having a density of not more than 0.940 g/cm$^3$, and an intermediate layer or layers provided between the outer layer and the inner layer wherein at least one intermediate layer comprises a linear polyethylene having a density of not more than 0.920 g/cm³, said density being different from the densities of the linear polyethylenes for forming the outer layer and the inner layer; and at least one of the outer layer, the inner layer and the intermediate layer or layers is formed from a linear polyethylene composition comprising each linear polyethylene and a high-density polyethylene having a density of not less than 0.950 g/cm³ in an amount of 5% to 55% by weight.

Preferred embodiments of the resin laminate according to the present invention are described below.

(1) The above-mentioned resin laminate wherein at least one of the outer layer, the inner layer and the intermediate layer is formed from a linear polyethylene composition comprising each linear polyethylene and a high-density polyethylene having a density of not less than 0.950 g/cm³, preferably 0.960 to 0.970 g/cm³, and Mw/Mn of not more than 4.0, preferably not more than 3.5, in an amount of 5% to 30% by weight.

(2) The above-mentioned resin laminate wherein the thickness of the intermediate layer or layers is not less than 40% and less than 75% of the total thickness of the whole laminate; and the intermediate layer or layers is formed from a linear polyethylene composition comprising the linear polyethylene and a high-density polyethylene having a density of not less than 0.950 g/cm³, preferably a high-density polyethylene having a density of 0.960 to 0.970 g/cm³ and Mw/Mn of not more than 4.0, in an amount of not less than 5% by weight and less than 15% by weight.

(3) The above-mentioned resin laminate wherein the thickness of the intermediate layer or layers is in the range of 75% to 90% of the total thickness of the whole laminate; the intermediate layer or layers is formed from a linear polyethylene composition comprising the linear polyethylene and a high-density polyethylene having a density of not less than 0.950 g/cm³, preferably a high-density polyethylene having a density of 0.960 to 0.970 g/cm³ and Mw/Mn of not more than 4.0, in an amount of 15% to 55% by weight; and each of the outer layer and the inner layer is formed from a linear polyethylene composition comprising each linear polyethylene and a high-density polyethylene having a density of not less than 0.950 g/cm³, preferably a high-density polyethylene having a density of 0.960 to 0.970 g/cm³ and Mw/Mn of not more than 4.0, in an amount of 5% to 55% by weight.

(4) The above-mentioned resin laminate wherein each of the outer layer and the inner layer is formed from a linear polyethylene composition comprising each linear polyethylene and a high-density polyethylene having a density of not less than 0.950 g/cm³, preferably a high-density polyethylene having a density of 0.960 to 0.970 g/cm³ and Mw/Mn of not more than 4.0, in an amount of 5% to 20% by weight.

The term "resin laminate" used in this specification means concretely a film, a sheet or a tube, each consisting of three or more layers.

The container according to the present invention is formed from a resin laminate comprises:

an outer layer comprising a linear polyethylene having a density of not less than 0.910 g/cm³ and less than 0.950 g/cm³, an inner layer comprising a linear polyethylene having a density of not more than 0.940 g/cm³, and an intermediate layer or layers provided between the outer layer and the inner layer, wherein at least one intermediate layer comprising a linear polyethylene having a density of not more than 0.920 g/cm³, said density being different from the densities of the linear polyethylenes for forming the outer layer and the inner layer; and at least one of said outer layer, said inner layer and said intermediate layer or layers is formed from a linear polyethylene composition comprising each linear polyethylene and a high-density polyethylene having a density of not less than 0.950 g/cm³ in an amount of 5% to 55% by weight.

The container of the present invention is formed from the above-mentioned resin laminate, and may have two or more chambers which are separated from each other by an easily peelable separator formed by heat sealing an easily peelable tape to the resin laminates.

In the present invention, preferred embodiments of the container are those formed from the aforementioned preferred embodiments of the resin laminate.

DETAILED DESCRIPTION OF THE INVENTION

The resin laminate according to the present invention and the container formed from the resin laminate will be described in detail hereinafter.

Resin Laminate

First, the resin laminate of the invention is described below.

The resin laminate of the invention comprises:

an outer layer comprises a linear polyethylene having a specific density, an inner layer comprises a linear polyethylene having a specific density, and an intermediate layer or layers provided between the outer layer and the inner layer, wherein at least one intermediate layer comprises a linear polyethylene having a specific density different from the densities of the linear polyethylenes for forming the outer layer and the inner layer;

and at least one of the outer layer, the inner layer and the intermediate layer or layers comprises a linear polyethylene composition comprising each linear polyethylene and a high-density polyethylene having a specific density in a specific amount.

Outer Layer

The linear polyethylene used for forming the outer layer of the resin laminate according to the invention include an ethylene homopolymer and an ethylene/α-olefin copolymer. Of these, the ethylene/α-olefin copolymer is preferably used in the invention.

Preferred examples of the α-olefin constituting the ethylene/α-olefin copolymer include 1-butene, 1-hexene, 4-methyl-1-pentene and 1-octene.

The linear polyethylene used in the invention has a density of not less than 0.910 g/cm³ and less than 0.950 g/cm³. When a linear polyethylene having the above-defined density is used for the outer layer, obtainable is a resin laminate with high heat resistance capable of forming a container which is hardly distorted or wrinkled even when subjected to a high-pressure steam sterilization.

In the preparation of the container using the resin laminate of the invention, if flexibility of the container is taken into serious consideration, it is preferred to use a linear polyethylene having a density of 0.910 to 0.930 g/cm$^3$, preferably 0.915 to 0.925 g/cm$^3$. If mechanical strength of the container is taken into serious consideration, it is preferred to use a linear polyethylene having a density of 0.930 to 0.945 g/cm$^3$, preferably 0.935 to 0.945 g/cm$^3$.

The linear polyethylene has a melt flow rate (MFR, measured in accordance with ASTM D 1238 at 190° C. under a load of 2.16 kg) of usually 0.1 to 20 g/10 min, preferably 0.2 to 10 g/10 min, more preferably 0.5 to 5 g/10 min.

In the invention, a high-density polyethylene which will be described below is preferably used as an outer layer forming component together with the above-mentioned linear polyethylene.

The high-density polyethylene employable herein has a density of not less than 0.950 g/cm$^3$, preferably 0.960 to 0.970 g/cm$^3$.

Examples of such high-density polyethylene include an ethylene homopolymer and copolymers of ethylene and α-olefins such as 1-butene, 1-hexene and 4-methyl-1-pentene.

Of those high-density polyethylenes, preferred is a high-density polyethylene having Mw/Mn (Mw: weight-average molecular weight measured by GPC, Mn: number-average molecular weight measured by GPC), that indicates a molecular weight distribution, of not more than 4.0, particularly not more than 3.5. When a high-density polyethylene having the above-defined Mw/Mn is used, obtainable is a resin laminate in the form of a film, a sheet or a tube having high transparency.

Particularly, a high-density polyethylene having a melt flow rate (MFR, measured in accordance with ASTM D-1238 at 190° C. under a load of 2.16 kg) of 10 to 30 g/10 min is preferably used in the invention.

When the above-mentioned high-density polyethylene is used as a component for forming the outer layer of the resin laminate according to the invention, the amount thereof is in the range of 5% to 55% by weight, preferably 5% to 30% by weight, more preferably 5% to 20% by weight, based on 100% by weight of the total amount of the linear polyethylene and the high-density polyethylene. The optimum amount of the high-density polyethylene in the outer layer is determined in consideration of the density of the linear polyethylene, etc.

When the high-density polyethylene is used for the outer layer in the above-defined amount, the resulting container can be further improved in the heat resistance and the mechanical strength without lowering the flexibility and the transparency. Moreover, heat welding between the outer layer and the intermediate layer can be easily carried out.

Intermediate Layer or Layers

The intermediate layer or layers of the resin laminate according to the invention is composed of one or more intermediate layers, and at least one of the intermediate layers comprises a linear polyethylene having a specific density.

The linear polyethylene used for forming the intermediate layer is a linear polyethylene having a low density, that is, so-called linear low-density polyethylene (LLDPE). This linear low-density polyethylene is an ethylene/α-olefin copolymer prepared by so-called low-pressure process. Examples of such copolymer include those of ethylene and α-olefins such as 1-butene, 1-hexene, 4-methyl- 1-pentene and 1-octene.

The linear polyethylene used for the intermediate layer or layers has a density of not more than 0.920 g/cm$^3$, preferably 0.880 to 0.920 g/cm$^3$, more preferably 0.885 to 0.915 g/cm$^3$, particularly preferably 0.885 to 0.905 g/cm$^3$. The density of the linear polyethylene for the intermediate layer is not more than 0.920 g/cm$^3$ as described above, and it is different from those of the linear polyethylenes for forming the outer layer and the inner layer. Preferably, for the intermediate layer, a linear polyethylene having a density lower than those of the linear polyethylenes for forming the outer layer and the inner layer may be used.

When a linear polyethylene having the above-defined density is used for the intermediate layer(s), obtainable is a resin laminate capable of forming a container having high flexibility, impact resistance and transparency.

The linear polyethylene has a melt flow rate (MFR, measured in accordance with ASTM D 1238 at 190° C. under a load of 2.16 kg) of usually 0.1 to 20 g/10 min, preferably 0.2 to 10 g/10 min, more preferably 0.5 to 5 g/10 min.

The intermediate layer(s) may optionally contain a high-density polyethylene together with the linear polyethylene. The density or the Mw/Mn of the high-density polyethylene optionally used for the intermediate layer may be the same or different from the density or the Mw/Mn of the high-density polyethylene optionally used for the aforesaid outer layer or the inner layer described later. The high-density polyethylene preferably used for the intermediate layer is identical with the preferred high-density polyethylene which is optionally used for the outer layer.

When the high-density polyethylene is used as a component for forming the intermediate layer(s) of the resin laminate according to the invention, the amount thereof is in the range of 5% to 55% by weight based on 100% by weight of the total amount of the linear polyethylene and the high-density polyethylene. The preferred amount of the high-density polyethylene varies depending on a ratio in the thickness of the intermediate layer(s) to the whole resin laminate. When the thickness of the intermediate layer is not less than 40% and less than 75% of the total thickness of the whole resin laminate, the high-density polyethylene is used in an amount of preferably not less than 5 % by weight and less than 15% by weight based on 100% by weight of the total amount of the linear polyethylene and the high-density polyethylene. When the thickness of the intermediate layer is in the range of 75% to 90% of the total thickness of the whole resin laminate, the high-density polyethylene is used in an amount of preferably 15% to 55% by weight, particularly preferably 15% to 30% by weight, based on 100% by weight of the total amount of the linear polyethylene and the high-density polyethylene.

When the high-density polyethylene is used for the intermediate layer in the above-defined amount, the resulting container can be further improved in the heat resistance and the mechanical strength without lowering the flexibility and the transparency. Moreover, heat welding between the outer layer and the intermediate layer and between the inner layer and the intermediate layer can be easily carried out.

The intermediate layer may be composed of a single layer of the intermediate layer formed from the above-mentioned linear polyethylene (LLDPE) or formed from a composition comprising the linear polyethylene (LLDPE) and the high-density polyethylene in the above-defined amounts. Otherwise, the intermediate layers may be in the form of a multi-layer structure composed of the above-mentioned intermediate layer and other intermediate layer(s) formed from other polyethylene(s). For example, the intermediate layers may be in the form of a three-layer structure wherein between two intermediate layers each formed from the above-mentioned polyethylene (LLDPE) is interposed one intermediate layer which is formed from other polyethylene than the above linear polyethylene and which has a thickness of about not more than 20% of the thickness of the whole intermediate layers. Examples of "other polyethylene" include a composition comprising the above-mentioned linear polyethylene (LLDPE) and high-density polyethylene in a mixing ratio different from the above-defined one, a composition comprising a linear polyethylene having a density of not more than 0.940 g/cm$^3$ and more than 0.920 g/cm$^3$ which is used for the inner layer described below and a high-density polyethylene, and a polyethylene having a density of not more than 0.940 g/cm$^3$ and more than 0.920 g/cm$^3$.

Inner Layer

The linear polyethylene used for forming the inner layer of the resin laminate according to the invention is an ethylene homopolymer or an ethylene/α-olefin copolymer similarly to the linear polyethylene used for the aforesaid outer layer, but this linear polyethylene is a little different in the density from the linear polyethylene for the outer layer.

The density of the linear polyethylene used for the inner layer is not more than 0.940 g/cm$^3$, preferably in the range of 0.910 to 0.930 g/cm$^3$.

The inner layer of the resin laminate is required to stand high temperatures in the high-temperature sterilization and to retain the sealing strength. These requirements can be fulfilled by use of a linear polyethylene having the above-defined density for the inner layer.

The linear polyethylene has a melt flow rate (MFR, measured in accordance with ASTM D 1238 at 190° C. under a load of 2.16 kg) of usually 0.1 to 20 g/10 min, preferably 0.2 to 10 g/10 min, more preferably 0.5 to 5 g/10 min.

The inner layer may optionally contain a high-density polyethylene together with the linear polyethylene.

The density or the Mw/Mn of the high-density polyethylene optionally used for the inner layer may be the same or different from the density or the Mw/Mn of the high-density polyethylene optionally used for the aforesaid outer layer or intermediate layer. The high-density polyethylene preferably used for the inner layer is identical with the preferred high-density polyethylene which is optionally used for the outer layer or the intermediate layer.

When the high-density polyethylene is used for the inner layer of the resin laminate according to the invention, the amount thereof is in the range of 5% to 55% by weight, preferably 5% to 30% by weight, more preferably 5% to 20% by weight, based on 100% by weight of the total amount of the linear polyethylene and the high-density polyethylene. The optimum amount of the high-density polyethylene in the inner layer is determined in consideration of the density of the linear polyethylene, etc.

When the high-density polyethylene is used for the inner layer in the above-defined amount, the resulting container can be further improved in the heat resistance and the mechanical strength without lowering the flexibility and the transparency. Moreover, heat welding between the inner layer and the intermediate layer can be easily carried out.

The resin laminate according to the invention is composed of such outer layer, intermediate layer(s) and inner layer as described above. The ratio in the thickness between each layers (outer layer:intermediate layer(s):inner layer) in the resin laminate is in the range of 5-30 : 90-40 : 5-30, preferably 5-20 : 90-60 : 5-20.

Preferred embodiments of the resin laminate according to the present invention are described below.

(1) The resin laminate wherein at least one of the outer layer, the inner layer and the intermediate layer(s) is formed from a linear polyethylene composition comprising the linear polyethylene for each layer and a high-density polyethylene having a density of not less than 0.950 g/cm$^3$, preferably 0.960 to 0.970 g/cm$^3$, and Mw/Mn of not more than 4.0, preferably not more than 3.5, in an amount of 5% to 30% by weight.

(2) The resin laminate wherein the thickness of the intermediate layer(s) is not less than 40% and less than 75% of the total thickness of the whole laminate; and the intermediate layer is formed from a linear polyethylene composition comprising the linear polyethylene for each layer and a high-density polyethylene having a density of not less than 0.950 g/cm$^3$, preferably a high-density polyethylene having a density of 0.960 to 0.970 g/cm$^3$ and Mw/Mn of not more than 4.0, in an amount of not less than 5% by weight but less than 15% by weight.

(3) The resin laminate wherein the thickness of the intermediate layer(s) is in the range of 75% to 90% of the total thickness of the whole laminate; the intermediate layer is formed from a linear polyethylene composition comprising the linear polyethylene for each layer and a high-density polyethylene having a density of not less than 0.950 g/cm$^3$, preferably a high-density polyethylene having a density of 0.960 to 0.970 g/cm$^3$ and Mw/Mn of not more than 4.0, in an amount of 15% to 55% by weight; and each of the outer layer and the inner layer is formed from a linear polyethylene composition comprising the linear polyethylene for each layer and a high-density polyethylene having a density of not less than 0.950 g/cm$^3$, preferably a high-density polyethylene having a density of 0.960 to 0.970 g/cm$^3$ and Mw/Mn of not more than 4.0, in an amount of 5% to 55% by weight.

(4) The resin laminate wherein each of the outer layer and the inner layer is formed from a linear polyethylene composition comprising the linear polyethylene for each layer and a high-density polyethylene having a density of not less than 0.950 g/cm$^3$, preferably a high-density polyethylene having a density of 0.960 to 0.970 g/cm$^3$ and Mw/Mn of not more than 4.0, in an amount of 5% to 20% by weight.

The resin laminate according to the invention is molded into a film, a sheet or a tube depending on the use application.

The film or the sheet of the resin laminate may be prepared by conventionally known processes, for example, a water-cooling co-extrusion inflation process, an air-cooling co-extrusion inflation process, a co-extrusion T-die process, a dry lamination process and an extrusion lamination process. Of these, the water-cooling co-extrusion inflation process and the co-extrusion T-die process are preferred from the viewpoints of film properties (e.g., transparency and hygienic qualities) and economical efficiency. As a matter of course, the conditions for preparing the film or the sheet, such as a temperature and a speed, are appropriately determined so that any deterioration of the resin is not brought about.

The film or the sheet is prepared to have an appropriate thickness depending on its application. For example, the thickness of the film or the sheet for medical use is in the range of 50 to 1,000 μm, preferably 100 to 700 μm, more preferably 150 to 300 μm.

The tube of the resin laminate can be prepared by a conventional extrusion blow molding method. The tube is made to have an appropriate thickness and an appropriate diameter depending on its application.

The resin laminates in various forms obtained as above are excellent in hygienic qualities, transparency and flexibility as well as in heat resistance, and hence they can be used as materials of various containers.

Container

Next, the container according to the present invention is described below.

The container of the invention is formed from the above-described resin laminate as a material. In the invention, preferred is a container formed from the preferred resin laminate of the invention as a material. A container generally includes a bottom, a wall and a lid. At least the wall of the container according to the invention comprises the resin laminate.

The container according to the invention may be a container having a single chamber, or may be a container having two or more chambers. In the container having plural chambers, the plural chambers are, for example, separated from each other by an easily peelable separator formed by heat sealing an easily peelable tape to the resin laminates.

The container of the invention is formed from the resin laminate comprising the outer layer, the intermediate layer(s) and the inner layer, each having specific thickness, therefore, it is excellent in the heat resistance. For example, the container is not wrinkled or distorted even after subjected to a retort treatment at 121° C. for 20 minutes. Further, the container is also excellent in the transparency and the flexibility.

The resin laminate in the form of a film or a sheet is very suitable for a bag-shaped flexible container such as an infusion bag. In the preparation of a container from the resin laminate in the form of a film or a sheet, the resin laminate is cut and heat sealed in a conventional manner, and if necessary then fitted with a mouth part, etc. by means of, for example, heat sealing. Thus, a container having desired shape and size can be prepared. In the preparation of a container having plural chambers, the resin laminate in the form of a film or a sheet is cut, then an easily peelable tape is interposed between the resin laminates, and the resin laminates are heat sealed while interposing the easily peelable tape therebetween at a proper temperature to form an easily peelable separator. Thus, a container having plural chambers can be prepared.

The easily peelable tape is, for example, a two-layer film comprising a polyethylene layer and a mixed resin layer of polyethylene and polypropylene. In concrete, preferred is such an easily peelable tape that the polyethylene layer is formed from a composition comprising a linear ethylene/α-olefin copolymer having a density of 0.910 to 0.930 g/cm³ in an amount of 60% to 80% by weight and the aforesaid high-density polyethylene in an amount of 20% to 40% by weight, and the mixed resin layer is formed from a composition comprising the aforesaid high-density polyethylene in an amount of 60% to 80% by weight and polypropylene (a propylene homopolymer or a copolymer of propylene and a small amount of other α-olefin than propylene) in an amount of 20% to 40% by weight. The thickness of this easily peelable tape is preferably in the range of about 50 to 150 μm.

The container in which plural chambers are separated from each other by the easily peelable tape which is heat sealed to the multi-layer films (resin laminates) is able to separately contain two or more kinds of liquid medicines and mix them in the case of use.

In more concrete, in a container having two chambers which are separated by the easily peelable tape and contain different liquid medicines, the easily peelable tape is peeled off by the application of a pressure into one chamber to remove the peelable tape (separation) between those chambers, whereby two kinds of liquid medicines are mixed together.

Figure 1:
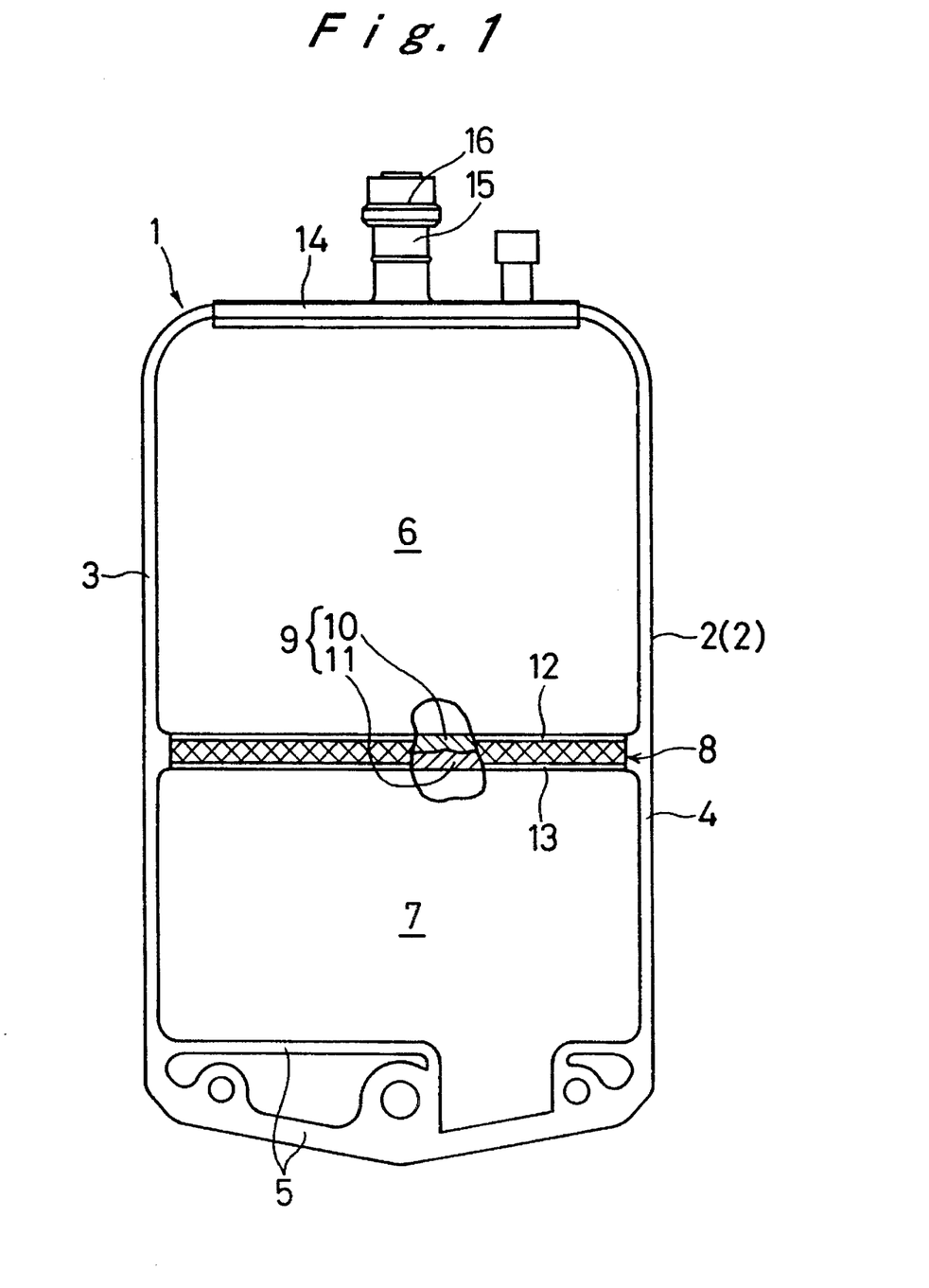
FIG. 1 is an elevational view of an infusion bag having two chambers according to the present invention.

One example of such plural-chamber container is an infusion bag as shown in FIG. 1

In FIG. 1, an infusion bag 1 has a bag body 2 formed from a sheet of the resin laminate according to the invention. The infusion bag 1 includes the bag body 2 whose peripheral portions, namely, a left side peripheral portion 3, a right side peripheral portion 4 and a lower side peripheral portion 5, are heat sealed. The bag body 2 has therein liquid medicine chambers 6 and 7 for containing different liquid medicines, and these chambers are separated from each other by a weakly sealed portion (easily peelable separator) 8 which is peelably heat sealed to the inner walls of the bag body 2. This weakly sealed portion 8 is formed by heat sealing an easily peelable tape 9, namely, a two-layer film composed of a polyethylene layer 10 and a mixed resin layer 11 of polyethylene and polypropylene, in such a state that the easily peelable tape 9 is interposed between the inner walls of the bag body 2. At the both ends, in the width direction, of the weakly sealed portion 8 are formed unsealed portions 12 and 13 facing to the liquid medicine chambers 6 and 7 respectively, so that a liquid pressure of the liquid medicine is easily applied onto the boundary between the each end of the weakly sealed portion 8 and the bag body 2. Accordingly, the weakly sealed portion 8 can be easily peeled off from the bag body 2. In FIG. 1, a trough-shaped mouth part 14 made of a polyethylene resin or a polyolefin resin such as polypropylene is heat sealed to the bag body 2. On the trough-like mouth part 14, at least one mouth 15 is provided, and onto the mouth 15 is fitted a cap 16 having a rubber stopper.

The infusion bag having such structure can be prepared in accordance with a process for the preparation of an infusion bag described in Japanese Utility Model Laid-Open Publication No. 5138/1993 (Japanese Utility Model Application No. 94870/1991.

In order to prepare a container from the resin laminate in the form of a tube according to the invention, the resin laminate in the form of a tube is subjected to a generally known blow molding process. Thus, a container of the present invention can be prepared. According to this process, a bottle-shaped container or a bag-shaped container having a relatively small capacity can be obtained.

EFFECT OF THE INVENTION

The resin laminate according to the present invention comprises an outer layer comprising a linear polyethylene having a specific density, an inner layer comprising a linear polyethylene having a specific density, and an intermediate layer or layers provided between the outer layer and the inner layer, wherein at least one intermediate layer comprises a linear polyethylene having a specific density different from the densities of the linear polyethylenes for forming the outer layer and the inner layer; and at least one of the outer layer, the inner layer and the intermediate layer or layers comprises a linear polyethylene composition comprising the linear polyethylene and a high-density polyethylene having a specific density in a specific amount. Therefore, the resin laminate is excellent in heat resistance, flexibility, mechanical strength and transparency.

The container according to the present invention is formed from the above-mentioned resin laminate, and therefore, the container is excellent in heat resistance, flexibility, mechanical strength and transparency.

Accordingly, the container of the invention can be used as a retort pouch for retort food and a medical container such as an infusion bag. The container of the invention is hardly deteriorated in sealing strength, drop-impact resistance, flexibility and transparency even when subjected to a sterilization under the severe conditions of a temperature of not lower than 120° C.

Further, the container having two or more chambers according to the invention is excellent in heat resistance, flexibility and transparency. Moreover, the heat sealed portion of the easily peelable tape is still stable even after subjected to the above-mentioned sterilization. Hence, there never arises such a problem that the heat sealed portion is peeled off during carriage and liquid medicines separately contained in each chambers are mixed together.

The present invention will be further described with reference to examples, but it should be construed that the invention is in no way limited to those examples.

EXAMPLES 1–8 & COMPARATIVE EXAMPLE 1

At first, the following linear polyethylenes was mixed with the following high-density polyethylenes in a mixing ratio set forth in Table 1 for 1 minute by a Henschel mixer to prepare various mixtures.

Next, each of the mixtures thus obtained was kneaded at a resin temperature of 200° C. by a single-screw extruder to obtain compositions in the form of pellets.

Then, the compositions were selected as shown in Table 1, and they were subjected to water-cooling co-extrusion inflation to form a laminate composed of an outer layer, one or three intermediate layers and an inner layer, each having a thickness set forth in Table 1.

The linear polyethylenes, the high-density polyethylenes and the polypropylene used for forming the laminated films and the easily peelable tapes in Examples 1 to 8 and Comparative Example 1 are listed below.

Linear Polyethylene (1) Ethylene/1-butene copolymer [hereinafter referred to as "PE (1)"]

Content of 1-butene: 3% by weight

Density: 0.940 g/cm$^3$

MFR (ASTM D 1238, 190° C., load of 2.16 kg): 2.1 g/10 min (2) Ethylene/1-butene copolymer [hereinafter referred to as "PE (2)"]

Content of 1-butene: 9% by weight

Density: 0.905 g/cm$^3$

MFR (ASTM D 1238, 190° C., load of 2.16 kg): 1.4 g/10 min (3) Ethylene/1-butene copolymer [hereinafter referred to as "PE (3)"]

Content of 1-butene: 14% by weight

Density: 0.895 g/cm$^3$

MFR (ASTM D 1238, 190° C., load of 2.16 kg): 1.0 g/10 min (4) Ethylene/1-butene copolymer [hereinafter referred to as "PE (4)"]

Content of 1-butene: 4% by weight

Density: 0.930 g/cm$^3$

MFR (ASTM D 1238, 190° C., load of 2.16 kg): 2.1 g/10 min (5) Ethylene/1-butene copolymer [hereinafter referred to as "PE (5)"]

Content of 1-butene: 7% by weight

Density: 0.920 g/cm$^3$

MFR (ASTM D 1238, 190° C., load of 2.16 kg): 2.1 g/10 min (6) Ethylene/1-butene copolymer [hereinafter referred to as "PE (6)"]

Content of 1-butene: 20% by weight

Density: 0.885 g/cm$^3$

MFR (ASTM D 1238, 190° C., load of 2.16 kg): 0.7 g/10 min

High-Density Polyethylene (1) Ethylene homopolymer [hereinafter referred to as "HP (1)"]

Density: 0.965 g/cm$^3$

Mw/Mn: 2.8

MFR (ASTM D 1238, 190° C., load of 2.16 kg): 1.5 g/10 min (2) Ethylene/1-butene copolymer [hereinafter referred to as "HP (2)"]

Content of 1-butene: 2% by weight

Density: 0.956 g/cm$^3$

Mw/Mn: 6.0

MFR (ASTM D 1238, 190° C., load of 2.16 kg): 0.7 g/10 min (3) Ethylene/1-butene copolymer [hereinafter referred to as "HP (3)"]

Content of 1-butene: 2.5% by weight

Density: 0.945 g/cm$^3$

Mw/Mn: 4.0

MFR (ASTM D 1238, 190° C., load of 2.16 kg): 10 g/10 min

Polypropylene (1) Isotactic polypropylene (hereinafter referred to as "PP")

Density: 0.910 g/cm$^3$

MFR (ASTM D 1238, 230° C., load of 2.16 kg): 7.1 g/10 min

The density of the above-listed each polyethylene and polypropylene was determined in accordance with JIS K 7112 at a temperature of 23°±0.1° C.

Subsequently, the laminated film and an easily peelable tape thus obtained were used to prepare a medical bag comprising two chambers having the whole capacity of 500 ml. The easily peelable tape had a two-layer structure consisting of a mixed resin layer made of PE (5) and HP (1) [PE (5) :HP (1)=7:3] and a mixed resin layer made of HP (2) and PP [HP (2) :PP=7:3], each of said layers having a thickness of 50 μm. The width of the tape was 10 mm. In the preparation of the bag, heat sealing of the peripheral portions was performed under the conditions of a temperature of 140° C. and a period of 3 seconds, while heat sealing of the easily peelable tape for forming a separator was performed under the conditions of a temperature of 140° C. and a period of 2 seconds.

The two-chamber medical bag obtained above was evaluated on heat resistance, sealing properties, transparency and flexibility in the following manners.

(a) Heat Resistance

After both chambers of the two-chamber medical bag were charged with distilled water, the bag was subjected to a high-pressure steam sterilization at 121° C. for 30 minutes.

The flexibility was evaluated by a Young's modulus ($kg/cm^2$) determined by a plastic tensile test in accordance with JIS K 7113.

The results are set forth in Table 1.

TABLE 1

| | Outer Layer [ratio by weight] | Intermediate Layer(s) [ratio by weight] | | | Inner Layer [ratio by weight] | Heat Resistance | Seeling Properties | Young's Modulus [kg/cm$^2$] | Haze [%] | Overall Evaluation |
|---|---|---|---|---|---|---|---|---|---|---|
| Ex. 1 | PE (1)/HP (1) = 80/20 | PE (2)/HP (1) = 70/30 | | | PE (4)/HP (1) = 80/20 | AA | AA | 2,800 | 12.7 | AA |
| Ex. 2 | PE (1)/HP (1) = 80/20 | PE(3)/HP (1) = 50/50 | | | PE (4)/HP (1) = 80/20 | AA | AA | 3,200 | 15.6 | AA |
| Ex. 3 | PE (1)/HP (1) = 80/20 | PE (2)/HP (1) = 80/20 | PE (4)/HP (1) = 80/20 | PE (2)/HP (1) = 80/20 | PE (4)/HP (1) = 80/20 | BB | AA | 2,700 | 10.9 | BB |
| Ex. 4 | PE (1)/HP (1) = 80/20 | PE (2)/HP (1) = 70/30 | PE (4)/HP (1) = 80/20 | PE (2)/HP (1) = 70/30 | PE (4)/HP (1) = 80/20 | BB | AA | 2,800 | 11.9 | AA |
| Ex. 5 | PE (1)/HP (1) = 80/20 | PE (3)/HP (1) = 50/50 | PE (4)/HP (1) = 80/20 | PE (3)/HP (1) = 50/50 | PE (4)/HP (1) = 80/20 | AA | AA | 3,200 | 15.7 | AA |
| Ex. 6 | PE (1)/HP (1) = 80/20 | PE (6)/HP (1) = 70/30 | PE (6)/HP (1) = 50/50 | PE (6)/HP (1) = 70/30 | PE (6)/HP (1) = 50/50 | AA | BB | 2,400 | 6.7 | BB |
| Ex. 7 | PE (1)/HP (1) = 80/20 | PE (6)/HP (1) = 70/30 | PE (4)/HP (1) = 80/20 | PE (6)/HP (1) = 70/30 | PE (4)/HP (1) = 80/20 | AA | AA | 2,500 | 7.5 | AA |
| Ex. 8 | PE (1)/HP (1) = 80/20 | PE (5)/HP (1) = 70/30 | PE (4)/HP (1) = 80/20 | PE (5)/HP (1) = 70/30 | PE (1)/HP (1) = 80/20 | BB | BB | 3,500 | 16.1 | BB |
| Comp Ex. 1 | PE (1)/HP (3) = 80/20 | PE (6)/HP (3) = 70/30 | PE (4)/HP (3) = 80/20 | PE (6)/HP (3) = 70/30 | PE (4)/HP (3) = 80/20 | CC | — | — | — | CC |

Through visual observation, the bag was inspected on the occurrence of distortion, breakage, wrinkle and blocking. The bag was evaluated on the heat resistance with the following three ranks.

AA: Any defect such as distortion is not observed.

BB: Defects such as distortion are slightly observed.

CC: Defects such as distortion are clearly observed.

(b) Sealing properties

After both chambers of the two-chamber medical bag were charged with distilled water, the bag was subjected to a high-pressure steam sterilization at 121° C. for 30 minutes. A state of heat sealing at the peripheral portions of the two-chamber medical bag and at the easily peelable separator thereof was inspected through visual observation. The bag was evaluated on the sealing properties with the following three ranks.

AA: The state of heat sealing is uniform, and any failure of heat sealing such as leakage of the water or distortion of the bag is not observed.

BB: Ununiform heat sealing is slightly observed, though any leakage of the water or any distortion of the bag is not observed.

CC: Failures of heat sealing such as leakage of the water and distortion of the bag are observed.

(c) Transparency

The transparency was evaluated by a haze (%) determined in accordance with ASTM D 883 and ASTM D 1003.

(d) Flexibility (Note 1) Thickness of outer layer: 15 μm

Thickness of inner layer: 15 μm

Thickness of intermediate layer in Examples 1 and 2: 170 μm

Thickness of three intermediate layers in Examples 3 to 8 and Comparative Example 1: 80 μm, 10 μm, 80 μm, respectively.

(Note 2) Overall Evaluation:

AA: very good, BB: good, CC: bad

As is evident from the results set forth in Table 1, the resin laminates and the containers according to the present invention are excellent in heat resistance, sealing properties, flexibility and transparency.

EXAMPLES 9–16 & COMPARTIVE EXAMPLES 2 AND 3

The following low-density linear polyethylenes (hereinafter referred to as "LLDPE") was mixed with the following high-density polyethylenes (hereinafter referred to as "HDPE") in a mixing ratio set forth in Table 2 for 1 minute by a Henschel mixer to prepare various mixtures.

LLDPE (1) Ethylene/1-butene copolymer Content of 1-butene: 7% by weight Density: 0.920 g/cm$^3$ (2) Ethylene/4-methyl-1-pentene copolymer Content of 4-methyl-1-pentene: 16% by weight Density: 0.910 g/cm$^3$ (3) Ethylene/1-butene copolymer Content of 1-butene: 9% by weight Density: 0.905 g/cm$^3$ (4) Ethylene/1-butene copolymer Content of 1-butene: 10% by weight Density: 0.903 g/cm³

HDPE (1) Ethylene homopolymer Density: 0.968 g/cm³ Mw/Mn: 3.0

(2) Ethylene homopolymer Density: 0.965 g/cm³ Mw/Mn: 3.0

(3) Ethylene/1-butene copolymer Content of 1-butene: 1% by weight Density: 0.960 g/cm³ Mw/Mn: 3.5

(4) Ethylene/1-butene copolymer Content of 1-butene: 3% by weight Density: 0.955 g/cm³ Mw/Mn: 5.6

(5) Ethylene/1-butene copolymer Content of 1-butene: 2% by weight Density: 0.950 g/cm³ Mw/Mn: 3.1

Thereafter, each of the mixtures obtained in the above was kneaded at a resin temperature of 200° C. by a single-screw extruder to obtain compositions in the form of pellets.

Then, the compositions, LLDPE and HDPE were selected as shown in Table 2, and they were molded using a T-die molding machine to form a laminate composed of an outer layer, an intermediate layer and an inner layer, each having a thickness set forth in Table 2.

From the laminate thus obtained, a medical container having the whole capacity of 500 ml was prepared. After a retort treatment of the medical container at 121° C. for 20 minutes, the container was measured on the Young's modulus (flexibility), a haze (transparency) and a transmittance in the following manners.

(1) Young's modulus

The Young's modulus was determined in accordance with JIS K 6781.

(2) Haze

The haze was determined in accordance with ASTM D 1003.

(3) Transmittance

The transmittance was determined in accordance with a Japan Pharmacopoeia plastic container test method.

Further, the medical container obtained above was also evaluated on the appearance with the following three ranks.

AA: The container is good.

BB: The container is wrinkled and shrunk.

CC: The container is shrunk and distorted.

The results are set forth in Table 2.

COMPARATIVE EXAMPLES 4 AND 5

The following high-pressure radical polymerization low-density polyethylene (hereinafter referred to as "HPLDPE") was mixed with the above-mentioned HDPE (ethylene homopolymer) having a density of 0.965 g/cm³ in a mixing ratio set forth in Table 3 for 1 minute by a Henschel mixer to prepare various mixtures.

(1) HPLDPE having a density of 0.927 g/cm³ Ethylene homopolymer having a long branched chain (2) HPLDPE having a density of 0.918 g/cm³ Ethylene homopolymer having a long branched chain The density of the above HPLDPE was determined in accordance with JIS K 7112-D at 23±0.1° C.

Thereafter, each of the mixtures obtained in the above was kneaded at a resin temperature of 200° C. by a single-screw extruder to obtain compositions in the form of pellets.

Then, the compositions were selected as shown in Table 3, and they were molded using a T-die molding machine to form a laminate composed of an outer layer, an intermediate layer and an inner layer, each having a thickness set forth in Table 3.

From the laminate thus obtained, a medical container having the whole capacity of 500 ml was prepared. After a retort treatment of the medical container at 121° C. for 20 minutes, Young's modulus, haze and transparency of the medical container were measured in the manners described above. Further, the medical container was also evaluated on the appearance by the above-mentioned test method.

The results are set fort in Table 3.

TABLE 2-1

| | Total thickness of the Whole Laminate [μ] | Outer Layer | | | | | |
|---|---|---|---|---|---|---|---|
| | | Thickness [μ] | LLDPE | | HDPE | | |
| | | | Density [g/cm³] | Ratio [%] | Density [g/cm³] | Ratio [%] | Mw/Mn |
| Ex. 9 | 100 | 30 | 0.920 | 80 | 0.965 | 20 | 3.0 |
| Ex. 10 | 200 | 30 | 0.920 | 80 | 0.965 | 20 | 3.0 |
| Ex. 11 | 200 | 30 | 0.920 | 80 | 0.965 | 20 | 3.0 |
| Ex. 12 | 200 | 30 | 0.920 | 80 | 0.965 | 20 | 3.0 |
| Ex. 13 | 200 | 30 | 0.920 | 80 | 0.950 | 20 | 3.1 |
| Ex. 14 | 175 | 60 | 0.920 | 90 | 0.968 | 10 | 3.0 |
| Ex. 15 | 100 | 30 | 0.920 | 80 | 0.955 | 20 | 5.6 |
| Ex. 16 | 100 | 30 | 0.920 | 60 | 0.965 | 40 | 3.0 |
| Comp. Ex. 2 | 200 | 30 | 0.920 | 100 | — | — | — |
| Comp. Ex. 3 | 200 | 30 | — | — | 0.960 | 100 | 3.5 |

(Note 1) LLDPE: linear low-density polyethylene HDPE: high-density polyethylene (Note 2) Ratio [%]: mixing ratio by weight [%]

TABLE 2-2

| | Intermediate Layer | | | | |
|---|---|---|---|---|---|
| | Thickness [μ] | LLDPE | | HDPE | |
| | | Density [g/cm³] | Ratio [%] | Density [g/cm³] | Ratio [%] | Mw/Mn |
| Ex. 9 | 40 | 0.905 | 90 | 0.965 | 10 | 3.0 |
| Ex. 10 | 140 | 0.905 | 90 | 0.965 | 10 | 3.0 |
| Ex. 11 | 140 | 0.905 | 100 | — | — | — |
| Ex. 12 | 140 | 0.905 | 90 | 0.965 | 10 | 3.0 |
| Ex. 13 | 140 | 0.910 | 90 | 0.950 | 10 | 3.1 |
| Ex. 14 | 75 | 0.903 | 90 | 0.968 | 10 | 3.0 |
| Ex. 15 | 40 | 0.905 | 95 | 0.955 | 5 | 5.6 |
| Ex. 16 | 40 | 0.905 | 70 | 0.965 | 30 | 3.0 |
| Comp. Ex. 2 | 140 | 0.905 | 100 | — | — | — |
| Comp. Ex. 3 | 140 | 0.905 | 100 | — | — | — |

(Note 1) LLDPE: linear low-density polyethylene HDPE: high-density polyethylene (Note 2) Ratio [%]: mixing ratio by weight [%]

TABLE 2-3

| | Inner Layer | | | | |
|---|---|---|---|---|---|
| | Thickness [μ] | LLDPE | | HDPE | |
| | | Density [g/cm³] | Ratio [%] | Density [g/cm³] | Ratio [%] | Mw/Mn |
| Ex. 9 | 30 | 0.920 | 80 | 0.965 | 20 | 3.0 |
| Ex. 10 | 30 | 0.920 | 80 | 0.965 | 20 | 3.0 |
| Ex. 11 | 30 | 0.920 | 100 | — | — | — |
| Ex. 12 | 30 | 0.920 | 100 | — | — | — |
| Ex. 13 | 30 | 0.920 | 80 | 0.950 | 20 | 3.1 |
| Ex. 14 | 40 | 0.920 | 90 | 0.968 | 10 | 3.0 |
| Ex. 15 | 30 | 0.920 | 80 | 0.955 | 20 | 5.6 |
| Ex. 16 | 30 | 0.920 | 70 | 0.965 | 30 | 3.0 |
| Comp. Ex. 2 | 30 | 0.920 | 100 | — | — | — |
| Comp. Ex. 3 | 30 | — | — | 0.960 | 100 | 3.5 |

TABLE 2-4

| | Physical Properties of Product (after retort treatment at 121° C. for 20 min.) | | | |
|---|---|---|---|---|
| | Transparency Haze [%] | Transparency Transmittance [%] | Appearance (Distortion) | Flexibility Young's Modulus [kg/cm²] |
| Ex. 9 | 7.0 | 87.2 | AA | 2,700 |
| Ex. 10 | 11 | 83.5 | AA | 2,700 |
| Ex. 11 | 5.5 | 90.1 | AA | 2,300 |
| Ex. 12 | 6.2 | 88.3 | AA | 2,500 |
| Ex. 13 | 8.6 | 83.6 | AA | 2,600 |
| Ex. 14 | 8.8 | 80.5 | AA | 2,600 |
| Ex. 15 | 30 | 75.2 | AA | 2,600 |
| Ex. 16 | 20 | 77.2 | AA | 2,900 |
| Comp. Ex. 2 | — | — | CC | — |
| Comp. Ex. 3 | 80 | 10.3 | AA | 3,500 |

TABLE 3-1

| | Total Thickness of the Whole Laminate [μ] | Outer Layer | | | | |
|---|---|---|---|---|---|---|
| | | Thickness [μ] | LLDPE | | HDPE | |
| | | | Density [g/cm³] | Ratio [%] | Density [g/cm³] | Ratio [%] | Mw/Mn |
| Comp. Ex. 4 | 100 | 30 | 0.927 | 80 | 0.965 | 20 | 3.0 |
| Comp. Ex. 5 | 200 | 30 | 0.918 | 80 | 0.965 | 20 | 3.0 |

(Note 1) HPLDPE: high-pressure radical polymerization low-density polyethylene

TABLE 3-2

| | Intermediate Layer | | | | |
|---|---|---|---|---|---|
| | Thickness [μ] | LLDPE | | HDPE | |
| | | Density [g/cm³] | Ratio [%] | Density [g/cm³] | Ratio [%] | Mw/Mn |
| Comp. Ex. 4 | 40 | 0.905 | 90 | 0.965 | 10 | 3.0 |
| Comp. Ex. 5 | 140 | 0.905 | 90 | 0.965 | 10 | 3.0 |

TABLE 3-3

| | Inner Layer | | | | |
|---|---|---|---|---|---|
| | Thickness [μ] | LLDPE | | HDPE | |
| | | Density [g/cm³] | Ratio [%] | Density [g/cm³] | Ratio [%] | Mw/Mn |
| Comp. Ex. 4 | 30 | 0.927 | 80 | 0.965 | 20 | 3.0 |
| Comp. Ex. 5 | 30 | 0.918 | 80 | 0.965 | 20 | 3.0 |

TABLE 3-4

| | Physical Properties of Product (after retort treatment at 121° C. for 20 min.) | | | |
|---|---|---|---|---|
| | Transparency Haze [%] | Transparency Transmittance [%] | Appearance (Distortion) | Flexibility Young's Modulus [kg/cm$^2$] |
| Comp. Ex. 4 | 43 | 81.8 | BB | 3,000 |
| Comp. Ex. 5 | 30 | 83.9 | BB | 2,500 |

What is claimed is:

1. A container formed from a resin laminate comprising:

an outer layer comprising a linear polyethylene having a density of not less than 0.910 g/cm$^3$ and less than 0.950 g/cm$^3$, an inner layer comprising a linear polyethylene having a density of not more than 0.940 g/cm$^3$, and an intermediate layer or layers provided between the outer layer and the inner layer, wherein at least one intermediate layer comprises a linear polyethylene having a density of not more than 0.920 g/cm$^3$, said density being different from the densities of the linear polyethylenes for forming the outer layer and the inner layer; and at least one of said outer layer, said inner layer and said intermediate layer or layers is formed from a linear polyethylene composition comprising each linear polyethylene and a high-density polyethylene having a density of not less than 0.950 g/cm$^3$ in an amount of 5% to 55% by weight.

2. The container as claimed in claim 1, wherein the density of the linear polyethylene for forming the intermediate layer or layers is lower than the densities of the linear polyethylenes for forming the outer layer and the inner layer.

3. The container as claimed in claim 1, wherein the density of the linear polyethylene for forming the intermediate layer or layers is higher than the densities of the linear polyethylenes for forming the outer layer and the inner layer.

4. The container as claimed in claim 1, wherein at least one of the outer layer, the inner layer and the intermediate layer or layers is formed from a linear polyethylene composition comprising each linear polyethylene and a high-density polyethylene having a density of not less than 0.950 g/cm$^3$ and Mw/Mn of not more than 4.0 in an amount of 5% to 30% by weight.

5. The container as claimed in claim 1, wherein the thickness of the intermediate layer or layers is not less than 40% and less than 75% of the total thickness of the whole laminate; and the intermediate layer or layers is formed from a linear polyethylene composition comprising each linear polyethylene and a high-density polyethylene having a density of not less than 0.950 g/cm$^3$ in an amount of not less than 5% by weight and less than 15% by weight.

6. The container as claimed in claim 1, wherein the thickness of the intermediate layer or layers is in the range of 75% to 90% of the total thickness of the whole laminate; the intermediate layer or layers is formed from a linear polyethylene composition comprising the linear polyethylene and a high-density polyethylene having a density of not less than 0.950 g/cm$^3$ in an amount of 15% to 55% by weight; and each of the outer layer and the inner layer is formed from a linear polyethylene composition comprising each linear polyethylene and a high-density polyethylene having a density of not less than 0.950 g/cm$^3$ in an amount of 5% to 55% by weight.

7. The container as claimed in claim 1, wherein each of the outer layer and the inner layer is formed from a linear polyethylene composition comprising each linear polyethylene and a high-density polyethylene having a density of not less than 0.950 g/cm$^3$ in an amount of 5% to 20% by weight.

8. The container as claimed in claim 1, wherein the high-density polyethylene has a density of 0.960 to 0.970 g/cm$^3$ and Mw/Mn of not more than 4.0.

9. The container as claimed in claim 1, wherein the container has two or more chambers which are separated from each other by an easily peelable separator formed by heat sealing an easily peelable tape to the resin laminates.

* * * * *